(12) United States Patent
Urry

(10) Patent No.: US 6,258,132 B1
(45) Date of Patent: Jul. 10, 2001

(54) PROCESS FOR PRODUCING IN AN ALKALINE CELL AN IN SITU SILVER LAYER ON A CATHODE CONTAINER

(75) Inventor: Lewis F. Urry, Elyria, OH (US)

(73) Assignee: Eveready Battery Company, Inc., St. Louis, MO (US)

( * ) Notice: Subject to any disclaimer, the term of this patent is extended or adjusted under 35 U.S.C. 154(b) by 0 days.

(21) Appl. No.: 09/300,631

(22) Filed: Apr. 27, 1999

(51) Int. Cl.⁷ .................................................. H01M 06/00
(52) U.S. Cl. ..................... 29/623.1; 29/623.5; 29/730; 429/169; 429/167; 429/176; 429/219
(58) Field of Search .................. 29/623.1, 623.5, 29/623.3, 730; 429/224, 219, 131, 137, 163, 165, 166, 169, 176, 167, 168

(56) References Cited

U.S. PATENT DOCUMENTS

| | | | |
|---|---|---|---|
| 2,861,116 | 11/1958 | Grubb, Jr. | 136/106 |
| 3,066,179 | 11/1962 | Ruben | 136/83 |
| 4,209,578 | 6/1980 | Balters | 429/206 |
| 4,298,506 | 11/1981 | Przybyla | 252/518 |
| 4,555,457 | 11/1985 | Dhanji | 429/199 |
| 4,581,305 * | 4/1986 | Jones et al. | 429/91 |
| 4,760,002 | 7/1988 | Schneider et al. | 429/206 |
| 4,925,747 | 5/1990 | Kordesch et al. | 429/59 |
| 4,957,827 | 9/1990 | Kordesch et al. | 429/60 |
| 5,162,169 | 11/1992 | Tomantschger | 429/59 |
| 5,281,497 | 1/1994 | Kordesch, et al. | 429/224 |
| 5,486,215 * | 1/1996 | Kelm et al. | 29/623.1 |
| 5,571,640 * | 11/1996 | Takeuchi et al. | 429/209 |

FOREIGN PATENT DOCUMENTS

| | | | |
|---|---|---|---|
| 52-048021 | 4/1977 | (JP) | H01M/4/06 |
| 8-264193 | 10/1996 | (JP) | H01M/6/06 |
| 8-264193A | 10/1996 | (JP) | H01M/6/06 |
| 93/12553 | 6/1993 | (WO) | H01M/6/06 |
| 93/18557 | 9/1993 | (WO) | H01M/10/36 |
| 96/17974 | 6/1996 | (WO) | C23C/18/42 |

OTHER PUBLICATIONS

PCT International Search Report, International Appl. No. PCT/US00/11113,filed Apr. 25, 2000, pp. 1–4.

\* cited by examiner

Primary Examiner—John S. Maples
Assistant Examiner—Raymond Alejandro
(74) Attorney, Agent, or Firm—Russell H. Toye, Jr.; Robert W. Welsh

(57) ABSTRACT

The present invention is a process for producing a silver layer, in situ, on an internal wall of a cathode container of an alkaline cell and the alkaline cell produced by the process. In the process a silver compound is dissolved in the cathode, which is in contact with the metal container of the cell, and silver ions diffuse through the cathode and displace metal on the inside surface of the container to coat the container surface with silver.

22 Claims, 1 Drawing Sheet

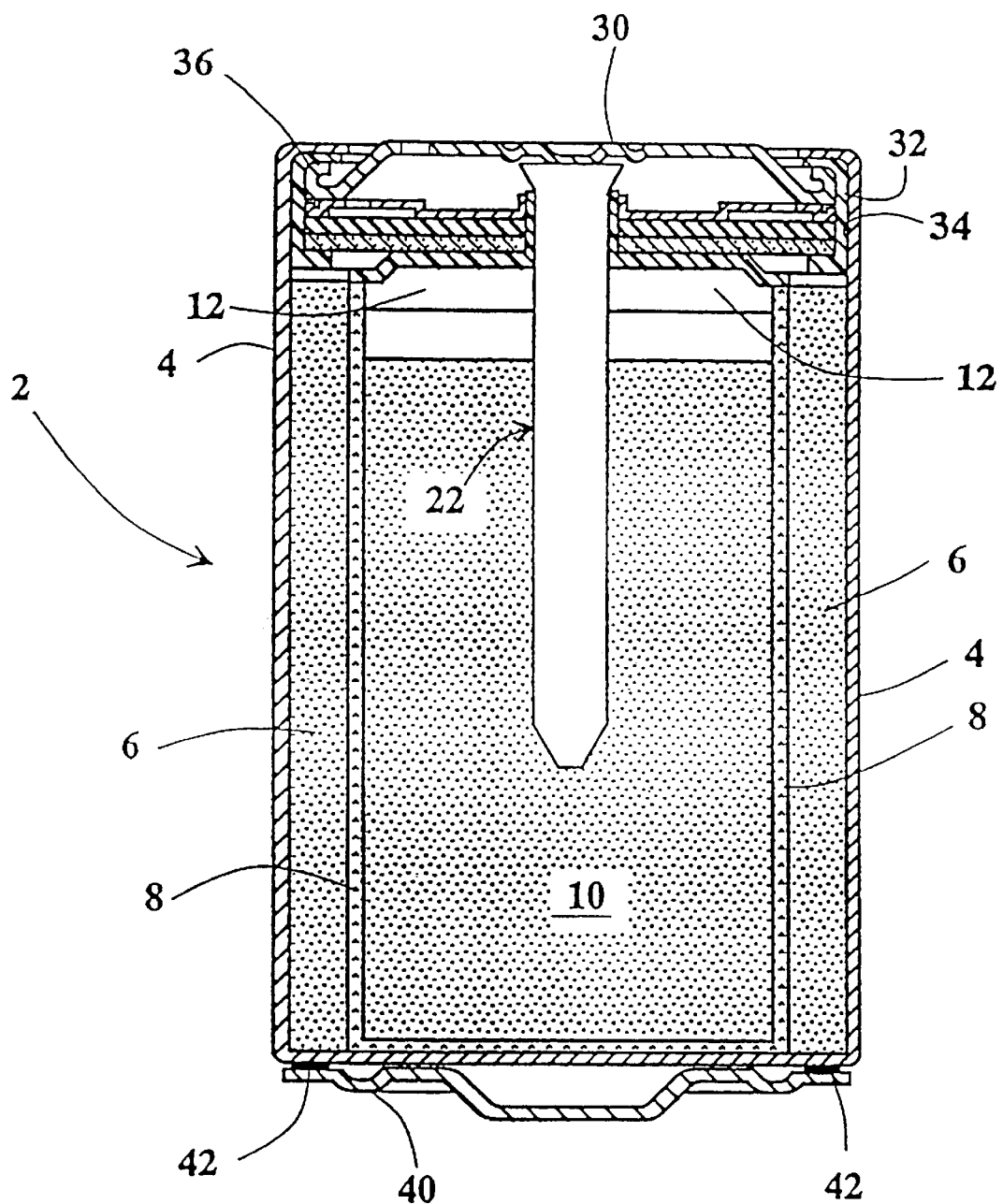

PROCESS FOR PRODUCING IN AN ALKALINE CELL AN IN SITU SILVER LAYER ON A CATHODE CONTAINER

FIELD OF THE INVENTION

The invention relates to a process of producing an electrochemical cell, such as an alkaline cell, in which a minor amount of silver oxide is mixed in the positive electrode. The silver oxide, being soluble in the electrolyte, results in a silver layer being deposited in situ on the portion of the surface of the container wall that is in contact with the positive electrode. The invention also relates to a cell made in accordance with the process.

BACKGROUND OF THE INVENTION

Alkaline cells are well known in the art and generally employ a zinc anode, a manganese dioxide cathode and an aqueous solution of potassium hydroxide for the electrolyte. These cells are readily available commercially for industrial and home applications. In conventional alkaline cells, the manganese dioxide is shielded from atmosphere (air) through seal means. To achieve maximum power output in a cell requires maximum amounts of the active components to be assembled in the cells.

Cathode containers and collectors for alkaline cells have used steel as the material for the container. The surface iron of the container oxidizes to a protective coating in high concentration aqueous potassium hydroxide electrolyte. However, this iron oxide coating is not a good electron conductor, and the thicker it gets the higher the resistance. Nickel is even worse than iron, in that the oxide is an even poorer electron conductor, however iron-nickel alloys are better than iron or nickel alone, and cobalt with nickel and iron is better than iron or iron-nickel. All the metal coatings show an increase in contact resistance with time as the oxide thickness builds up.

It has long been recognized that the contact between the container and the positive electrode is an important factor in cell design. In the prior art, experiments with container coatings were performed and it was found that a favored container coating was a manganese nitrate, EMD, graphite and water mixture, baked at 350° C. to convert the nitrate to $MnO_2$. A preferred conductive coating for containers today seems to be a graphite paint. This is a suspension of a binder and graphite powder in a liquid carrier. The paint is sprayed, swabbed, brushed, etc., onto the surface to be coated. When the liquid carrier evaporates, graphite particles, adhered to each other and to the metal surface by the binder, remain on the surface. The volume percent of the binder, which is usually an insulator, should be just adequate to bind the graphite so that it will not electrically isolate the graphite particles.

Japanese Patent Application No. 8-264193 discloses an alkaline manganese battery using a positive electrode containing manganese dioxide and a carbon material tightly contained in a positive electrode container made of metallic material. A conductor film, containing a material selected from the group comprising an oxide of Ag or Ag and Ni and a binder, is sprayed on the contacting surfaces of the positive electrode container and the positive electrode.

Another problem with graphite coatings is that they are easily scraped off by engagement with the positive electrode. Japanese Patent Application No. 8-264193 proposes to solve this problem by spraying a solution of a silver compound/binder onto the container, but this coating is also easily scraped or peeled off. Inherently, any coating added to the container surface before the positive electrode is inserted into or formed within the container is subject to damage from abrasion by the electrode material. The process described in this reference also requires an additional step of spraying the interior surface of the container, and the sprayed-on material must then be dried before the positive electrode can be inserted or formed within the container. The amounts of silver required by the process of this reference are large because of the method of application. These large amounts of silver oxide are soluble in the electrolyte. Some silver ions may migrate through the separator to the anode and react with the active anode material to generate hydrogen gas. Silver ions may also migrate to the separator and cause short circuits during discharge of the cell.

The applicant has also found that sprayed-on conductive coatings, such as graphite or silver with a binder, are prone to delaminate from the can, resulting in drastic performance reductions. The delamination does not need to be pronounced to produce these performance reductions. Small separation distances between the coating and the container allow capillary convection of electrolyte to produce a sandwich-like structure incapable of effective electron transfer. The sandwich structure (delaminated coating on one side, electrolyte in the center and the can surface on the other side) acts as a very effective electrical insulator, much like a double pane window acts as an effective heat insulator. The electrolyte stagnant between the coating and the can surface prevents electron transfer between these two surfaces.

It is an object of the present invention to provide a process for assembling an electrochemical cell with a positive electrode container in which the surface of the wall of the container that contacts the positive electrode has a deposited layer of silver.

It is another object of the present invention to provide a process for assembling an alkaline manganese dioxide cell that is cost effective to produce and easy to assemble.

It is another object of the present invention to provide an electrochemical cell that has a positive container with a wall that contacts the positive electrode having a silver layer formed in situ between the wall and the positive electrode.

It is another object of the present invention to provide an alkaline manganese dioxide cell that has a silver layer formed in situ on the wall of the positive container that contains the positive electrode.

It is another object of the present invention to provide a conductive surface for the positive electrode container after insertion or formation of the positive electrode.

It is another object of the present invention to provide a conductive surface for the positive electrode container which contains a minimum amount of silver.

It is another object of the present invention to provide a process of preparing the surface of a positive electrode container without the addition of more process steps.

It is another object of the present invention to provide a conductive surface for the positive electrode container which allows for the elimination of any cladding of the positive electrode container.

The above and further objects will become apparent upon consideration of the following description and drawing thereof.

SUMMARY OF THE INVENTION

The invention relates to a process of assembling the components of an electrochemical cell comprising the steps:

a. preparing an electrode comprising an electrochemically active material, an electrolyte comprising a salt and a solvent, an electrically conductive container having a wall with an inner surface comprising a first metal, and a compound of a second metal more electropositive than the first metal;

b. assembling the electrode, electrolyte and metal compound within the container so the electrode is in contact with the wall of the container, the electrolyte is mixed with the electrode, and the electrolyte is in contact with both the metal compound and the inner surface of the container;

c. dissolving the metal compound in the electrolyte; and d. producing an electrically conductive layer of the second metal on the inner surface of the wall of the container.

The invention also relates to a process for making an electrochemical cell having a cell container with a wall, a positive electrode that contacts the container wall, a negative electrode and an electrolyte, the process comprising:

a. adding an amount of a silver compound to the cell; and b. replacing at least a portion of material of the container wall in contact with the positive electrode with silver to form a layer of silver, without discharging the cell.

The invention relates to an electrochemical cell comprising a first electrode, a second electrode, a separator between the first and second electrodes and an electrolyte within a cell container having an inner surface, wherein at least a portion of the inner surface of the container contains a layer of silver, and wherein the inner surface of the container is not coated with silver prior to combining the container with other cell components.

The invention also relates to an electrochemical cell having an electrode and an electrolyte positioned within a conductive housing, wherein the conductive housing comprises an internal wall positioned adjacent the electrode, and the internal wall of the container contains a layer of silver produced in situ in the undischarged cell.

The applicant has discovered that a small amount of silver oxide mixed with a manganese dioxide containing mix of an alkaline-manganese cell will provide service advantages over the use of manganese dioxide alone. Silver oxide (both $Ag_2O$ and $AgO$) is soluble in an aqueous potassium hydroxide and other alkaline solutions suitable for use as an electrolyte in an alkaline-manganese-zinc cell. Silver halide, such as silver chloride, will be converted to silver oxide in an aqueous potassium hydroxide electrolyte solution and is also suitable for use in cells with alkaline electrolytes. Silver halide is also soluble in an acidic electrolyte solution, making it suitable for use in cells with such electrolytes as well. Although this invention is particularly relevant to alkaline cells, it is not so limited and anticipates all silver compounds (including but not limited to silver oxides and silver salts) soluble in electrolytic solutions. The dissolution of the silver oxide will result in a thin silver layer deposited on the wall of the container that contacts the positive electrode. The amount of silver compound that is necessary is an amount resulting in a single atomic layer of residue on the container. Compounds of other metals that are more electropositive than the metal of the inside container surface (e.g., iron, nickel and/or cobalt) are also suitable for use in this invention if they are soluble in the electrolyte solution.

With cells made with silver oxide substituted for 4.4% of the manganese dioxide, the cells gave an increase in performance and a higher short circuit amperage than would have been expected if the only contribution of the silver oxide was as a depolarizer. Discharging the cell would reduce silver oxide to metallic silver, improving conductivity and short circuit amperage, but reduction of silver oxide would not be expected in an undischarged cell. It was theorized that, since, silver oxide is soluble in an aqueous electrolyte of potassium hydroxide and silver is more electropositive than iron, nickel and cobalt, the silver displaced these metals on the surface of the can in contact with the silver oxide/electrolyte solution. The result would be a silver coating on the container, which would improve the electrical contact between the positive electrode and the positive container.

To confirm this theory, silver oxide was dissolved in a 9N potassium hydroxide solution left in an AA (LR6) container over night. After decanting the solution a silver layer was left on the wall of the container. Cells made from these containers did show a higher short circuit amperage and gave increased service to 1.0 volt on 2.0 amps continuous tests.

The amount of silver oxide that is required is preferably an effective amount that will provide a silver layer on the internal wall of the cell's container wall. For most alkaline cell applications, the minimum amount of silver oxide to be incorporated in the positive electrode mix can be that amount needed to form a monoatomic layer of silver covering that portion of the container that will be in contact with the positive electrode. This corresponds with a silver oxide amount of about 0.00003 weight percent of the active amount in the positive electrode. Amounts greater than a maximum can result in the silver plating out on the separator, causing short circuiting. The preferred range is between about 0.01 weight percent and about 0.1 weight percent, and most preferably between about 0.02 weight percent and about 0.05 weight percent of the active material in the positive electrode.

The minimum thickness of the silver layer of this invention should be that corresponding to the atomic diameter of the silver atom, that is 2.88 Angstroms. Generally, the less silver oxide added, the less cost added to the finished cell. The silver layer thickness is preferably about 0.0005 micron to about .3 micron; more preferably between about 0.007 micron to about 1 micron; and most preferably between 0.0009 micron and 0.001 micron.

A conductive material, such as graphite, is generally used in the positive electrode mix to provide electrical contact to the positive electrode container. Graphite is an inert material in the cell and occupies space that could be used for the active components of the cell. A benefit of the invention is that the addition of silver oxide to the positive electrode mix provides electrical contact via the silver layer between the container and the positive electrode, so the amount of graphite in the positive electrode mix can be reduced. This makes more volume available for the active components of the cell which will result in an increase in the discharge capacity of the cell.

The electrochemical cells of the invention can comprise an alkaline electrolyte, a silver oxide-containing cathode and an anode arranged in a sealed container in a manner effective to provide electrochemical energy, i.e. when the cell is placed in a circuit, electrochemical energy is provided to the circuit. The cells have terminals of opposite polarity. One terminal is in contact with the cathode and the other is in contact with the anode. The cell is sealed in a manner effective to contain the cell components in the container under conditions of transport and use and to prevent air from entering the cell. The cell construction can include a metallic container suitably constructed of steel or other metal and can be plated in whole or in part. The plating can consist of any metal less positive than silver.

A tubular cathode containing the active cathode material, silver oxide, conductor and, in some cases, a binder can be inserted so as to engage the inner surface of the container. A separator suitably made of a non-woven cellulose or polymer fiber, micro-porous plastic or cellophane film can be lined on the inner surface of the tubular cathode. In this construction the container is in contact with the cathode and thus is the positive or cathodic terminal.

The preferred cathode used in this invention is a mixture of the manganese dioxide, an electrically conductive material and a relatively minor amount of silver oxide. There are many types of suitable conductive materials known. Graphite, synthetic or natural, is preferably used in the cells of this invention, and is readily commercially available. The cathode can further comprise a binder. Examples of suitable binders include polytetrafluoroethylene and polyethylene. Preferably, the cathodes could comprise a major amount of manganese dioxide, a conductive amount of the graphite and a minor amount of silver oxide and often a binding amount of a binder. Typically, the manganese dioxide will comprise between about 80 to 97 weight percent of the total cathode weight. When a binder is employed, the binder will comprise less than about 4% by weight. Silver oxide should be present in the amounts listed above. The remainder of the cathode will be comprised of graphite and electrolyte solution. When the cathode is prepared within the container, the amount of the electrolyte solution added is sufficient to wet the dry components and to provide a mixture than can be molded. The cathodes are preferably prepared by mixing the components together and dispensing the mix into the container. The mix is then molded or compressed against the inside of the container. Alternatively, the mix can be pre-molded as rings and the rings pressed into the container.

The preferred electrolyte used in this invention is an aqueous alkaline solution, such a potassium hydroxide or sodium hydroxide. The concentration of the solution can be any concentration that provides for ionic conductivity. In the assembled cell the concentration of the aqueous alkaline solution ranges from about 30% to about 45%. Alternatively, the electrolyte may be an acidic or a neutral solution.

A preferred anode is made of a mixture of active anode material, electrolyte, and optionally an electrolyte-swellable binder, such as a polyacrylic acid, which can be enclosed with the separator, separating the cathode from the anode. An anode current collector member is inserted into the anode.

Preferably, zinc is used as the active anode material in the cells of the invention. Preferably, the zinc is low gassing zinc and is in powder form. The powdered zinc is combined with a binder and an amount of the electrolyte solution to form a gel. The anode gel generally expands when it is discharged. Other optional components may also be included in the anode.

It is undesirable for any of silver compound or silver ions from the silver compound to be in contact with the anode. If silver ions are present they will react with the zinc, consuming part of the zinc and generating hydrogen gas. The silver compound and silver ions can be kept out of the anode by allowing sufficient time for all of the soluble silver in the cathode to deposit onto the container wall before the anode is added to the cell and/or by using a separator material, such as cellophane, that will not allow silver ions to pass from the cathode to the anode.

The cell is closed with a cover and sealed. The cover is in electrical contact with the anode current collector member and is the negative or anodic terminal of the cell. Any conventional seal can be employed. It is desired that the cell construction not have a venting means that would freely vent due to the normal pressure generated in the cell during a normal discharge.

BRIEF DESCRIPTION OF THE DRAWINGS

The sole drawing is a cross-sectional view of an inverted alkaline cell of the present invention.

DETAILED DESCRIPTION OF THE DRAWINGS

Referring to the drawing, the alkaline cell 2 is assembled in a conventional conductive steel container 4, which also forms an external terminal for the cell. The cathode 6 for cell 2 is a mixture of manganese dioxide, silver oxide, graphite, electrolyte and sometimes a binder or other additives.

After the cathode 6 is formed in or inserted into the container 4, a separator 8 is added to physically isolate the anode material 10 from the cathode 6 and container 4 while still permitting ion transport between the electrodes. The separator 8 could be made of two strips of separator material arranged perpendicular to one another and inserted into the cathode's tubular shaped opening, thereby forming a separator basket with a central opening. The anode mix 10 is then added to the separator-lined cavity of the cell. An open area 12 is left in the cell to provide room for any expansion of the anode mix 10. The anode current collector 22 is located in and protruding from anode mix 10.

To complete assembly of the cell an external bottom cover 30 is placed into the steel container 4 and is also insulated from contact with the container 4 by the peripheral wall 32 of seal member 34. The bottom cover 30 makes electrical contact with current collector 22, making the bottom cover 30 the external negative terminal for cell 2. The edge of the steel container 4 is rolled to hold the upturned portion 36 of the bottom cover 30 locked in position in the bottom of the cell 2. Top cover 40 can be fastened to the container by welds 42 after the cathode is rammed into place.

As described above, in the preferred embodiment of the invention, silver oxide is a component of the cathode during the cell assembly. After the cathode is formed in the cell or inserted and fixed adjacent to the inside surface of the container 4, the cathode is contacted with electrolyte. The silver oxide or other silver compound is soluble in the electrolyte, dissociates into its ionic components, and diffuses through the cathode to the inside surface of the container 4. As described, the inside surface of the container can be plated or clad with nickel, a nickel cobalt alloy, or bare iron. The silver ions being more positive than the iron, nickel, or cobalt displace these ions and coat the inside surface of the container. The displacement creates a diffusion potential, which drives further migration towards the inner surface. This process of dissolution, diffusion, and displacement continues until either all the silver from the silver compound is consumed or the cell is discharged. During discharge, the silver oxide is reduced to silver metal and the process is halted.

The silver compound can be put into the cell in many ways, depending upon the cell design, cell materials and manufacturing considerations such as convenience, efficiency and the manufacturing process and equipment already being used. For example, powdered silver compound may be mixed with other dry cathode ingredients, followed by addition of electrolyte, either before or after the other cathode components are put into the container. Alternatively, the silver compound may be dissolved in electrolyte before it is added to the dry ingredients. Silver compound can also be dissolved in electrolyte which is put into the container before the cathode or dry cathode ingredients. The precise method or sequence of adding the silver compound is not especially important, except that the silver compound or dissolved silver compound preferably should not come in contact with the anode. This will prevent reaction of the silver ions with the active anode material which would make that silver unavailable for its intended purpose, reduce the discharge capacity of the cell and possibly create undesirable reaction products.

Each of the processes of dissolution, diffusion, and displacement can be accelerated by increasing the temperature. The applicant has found that these processes continue for many hours at ambient temperatures. The cell container is adequately coated in minutes at ambient temperatures; however, the amount of silver accumulated on the container continues to increase. Using heated electrolyte can accelerate the process so that the bulk of the silver accumulates on the container's inner surface in a shorter length of time. Other heating methods or means of accelerating the process are equivalent and will accomplish the same results.

The silver coating on the inner surface acts to enhance electrical contact between the cathode and the container. This coating is formed in-situ after the formation of the cathode, and thus is not damaged during cathode formation. The process of formation requires only minimal amounts of silver to be added to the cell, which is more cost effective than prior art coatings. The process of formation does not require any modification in the existing cell construction process. In fact, it allows for the elimination of container cladding, thus resulting in additional cost effectiveness.

EXAMPLE

Several AA LR6 aqueous alkaline cells were produced using a cathode comprising manganese dioxide, graphite and a binder; an anode comprising zinc and an electrolyte of potassium hydroxide solution; and separator; all assembled in steel containers and conductive covers. Cell samples 1 and 10 were prepared as standard. In cell sample 1, the internal wall was uncoated, whereas in cell sample 10, a gold coating was electroplated onto the inner surface of the cell container. These two standards were thought to represent the boundaries of performance for cathode to container contact. In cell samples 2 and 3, a graphite coating was sprayed onto the inner surface of the cell container. In cell samples 4 and 5, silver was deposited onto the cell container before the cathode was added. In sample 4, silver oxide was added to an alkaline potassium hydroxide solution and allowed to set before the solution was decanted leaving a silver coating on the inner surface of the container. In cell sample 5 silver chloride, a silver halide, was dissolved in an acidic solution and added to the can; after being allowed to set, the solution was decanted. In another sample (not included in the table below) silver nitrate was dissolved in an acidic solution. The silver nitrate, being highly soluble, resulted in a very thick silver coating, which was easily delaminated and therefore not tested. Samples 6 and 7 were prepared according to the present invention, 0.19 and 0.002 grams of silver oxide were added respectively to the cathode mix. In samples 8 and 9, silver was electroplated onto the cell container at different thicknesses.

The cells were discharged at 2.0 amps to a 1-volt cutoff. The short circuit amperage (S. C. Amp) was measured along with time required for the cell to reach a volt cutoff at a continuous discharge of 2.0 amperes. After testing, the cells were dismantled and the amount of metal deposited on the internal surface of the cell container was measured. This data are shown in the following table.

TABLE

| Cell Sample | S. C. Amp | Time to 1 Volt | Coating Type | Coating Weight |
| --- | --- | --- | --- | --- |
| 1 | 15.4 | 3.5 mins. | none | — |
| 2 | 17.3 | 8.0 mins. | graphite | — |
| 3 | 20.5 | 7.0 mins. | graphite | — |
| 4 | 18.7 | 8.5 mins. | silver | 0.34 mg. |
| 5 | 20.8 | 10.0 mins. | silver | 0.78 mg. |
| 6 | 20.5 | 10.2 mins. | silver | 0.46 mg. |
| 7 | 16.4 | 11.5 mins. | silver | — |
| 8 | 19.7 | 11.0 mins. | silver | 10.0 mg. |
| 9 | 24.1 | 11.8 mins. | silver | 0.20 mg. |
| 10 | 24.8 | 12.0 mins. | gold | 0.50 mg. |

The data show that the silver coating on the container's wall provided a longer service life than the use of a graphite coating for cell discharged continuously at 2.0 amperes to a 1 volt cutoff.

The data also show that the addition of very small amounts of silver oxide to the cathode mix results in cell performance increases approaching those produced by the electroplated gold reference sample. Though the invention has been described with respect to preferred embodiments thereof, many variations and modifications will become apparent to those skilled in the art. It is therefore the intention that the appended claims be interpreted as broadly as possible in view of the prior art including all such variations and modifications.

What is claimed:

1. A process of assembling the components of an electrochemical cell comprising the steps:
    a. preparing an electrode comprising an electrochemically active material, an electrolyte comprising a salt and a solvent, an electrically conductive container having a wall with an inner surface comprising a first metal, and a compound of a second metal more electropositive than the first metal in an amount no greater than 0.1 weight percent of the active material in the electrode;
    b. assembling the electrode, electrolyte and compound of the second metal within the container so the electrode is in contact with the wall of the container, the electrolyte is mixed with the electrode, and the electrolyte is in contact with both the compound of the second metal and the inner surface of the container;
    c. dissolving the compound of the second metal in the electrolyte; and
    d. producing an electrically conductive layer of the second metal on the inner surface of the wall of the container.

2. The process of claim 1, wherein the layer of the second metal is produced by replacing at least a portion of the first metal on the inner surface of the container wall with the second metal.

3. The process of claim 1, wherein the compound of the second metal is a silver compound and the layer of the second metal is a silver layer.

4. The process of claim 3, wherein the silver compound is a silver oxide.

5. The process of claim 3, wherein the thickness of the silver layer is between about 0.0001 micron and about 3 microns.

6. The process of claim 3, wherein the amount of silver compound in the electrode is between about 0.01 weight percent and about 0.1 weight percent of the active material in the electrode.

7. The process of claim 3, wherein the first metal is at least one metal selected from the group consisting of iron, nickel and cobalt.

8. The process of claim 1, wherein the electrochemically active material comprises manganese dioxide.

9. The process of claim 1, wherein the electrolyte comprises an aqueous alkaline solution.

10. The process of claim 9, wherein the aqueous alkaline solution comprises potassium hydroxide.

11. The process of claim 1, wherein the metal compound is added to the electrode before the electrode is assembled into the container.

12. The process of claim 1, wherein the compound of the second metal is dissolved in the electrolyte before the electrolyte is assembled with the electrode in the container.

13. The process of claim 12, wherein the electrolyte is added to the electrode before the electrode is assembled into the container.

14. A process for making an electrochemical cell having a cell container with a wall, a positive electrode that contains an active material and contacts the container wall, a negative electrode and an electrolyte, the process comprising:
   (a) adding a silver compound to the cell in an amount no greater than 0.1 weight percent of the active material in the positive electrode; and
   (b) replacing at least a portion of material of the container wall in contact with the positive electrode with silver to form a layer of silver, without discharging the cell.

15. The process of claim 14, wherein the silver compound is added to the positive electrode.

16. The process of claim 14, wherein the silver compound is added to the electrolyte.

17. The process of claim 14, wherein the silver compound is added with a liquid to the container and the liquid is removed from the container after the layer of silver is formed.

18. The process of claim 14, wherein the layer of silver formed consists of silver.

19. The process of claim 14, wherein the layer of silver formed comprises at least a monoatomic layer of silver atoms.

20. The process of claim 14, wherein, prior to step (b), the process further comprises the steps of dissolving the silver compound in a liquid so the silver compound dissociates into silver ions, diffusing the silver ions through the liquid to a surface of the container wall, and reducing the silver ions to silver metal.

21. The process of claim 20, wherein the liquid is heated.

22. The process of claim 20, wherein the silver compound is at least one selected from the group consisting of silver oxide and silver chloride, and the liquid is a alkaline solution.

* * * * *